(12) United States Patent
Shedden et al.

(10) Patent No.: US 12,085,116 B2
(45) Date of Patent: Sep. 10, 2024

(54) THREADED FASTENER PAIR, POST ANCHOR SYSTEM AND METHOD OF SECURING A POST TO A POST ANCHOR

(71) Applicant: TOPAZ TRADING PTY LTD, Tasmania (AU)

(72) Inventors: Timothy Shedden, Tasmania (AU); Jamie Shedden, Tasmania (AU); Jason Shedden, Tasmania (AU)

(73) Assignee: TOPAZ TRADING PTY LTD, Brighton Tas (AU)

( * ) Notice: Subject to any disclaimer, the term of this patent is extended or adjusted under 35 U.S.C. 154(b) by 156 days.

(21) Appl. No.: 17/609,499

(22) PCT Filed: May 13, 2020

(86) PCT No.: PCT/AU2020/050470
§ 371 (c)(1),
(2) Date: Nov. 8, 2021

(87) PCT Pub. No.: WO2020/227769
PCT Pub. Date: Nov. 19, 2020

(65) Prior Publication Data
US 2022/0228612 A1    Jul. 21, 2022

(30) Foreign Application Priority Data
May 14, 2019    (AU) .............................. 2019901647

(51) Int. Cl.
*F16B 5/02*       (2006.01)
*E04H 12/22*     (2006.01)
(Continued)

(52) U.S. Cl.
CPC ............ *F16B 5/02* (2013.01); *E04H 12/2276* (2013.01); *F16B 7/182* (2013.01); *F16B 37/145* (2013.01);
(Continued)

(58) Field of Classification Search
CPC .......... F16B 5/02; F16B 7/182; F16B 37/145; F16B 2037/007; E04H 12/2276; E04H 12/2269; E04C 3/16
(Continued)

(56) References Cited

U.S. PATENT DOCUMENTS 207,871 A * 9/1878 Horton et al. ............ F16J 15/32
                                                                         277/936
375,350 A * 12/1887 Glover .................... F16B 35/06
                                                                         411/338
(Continued)

FOREIGN PATENT DOCUMENTS

DE       202006008339      10/2006
KR       20-2009-0007770    7/2009
(Continued)

OTHER PUBLICATIONS

International Search Report and Written Opinion for International (PCT) Patent Application No. PCT/AU2020/050470, dated Jul. 6, 2020, 15 pages.
(Continued)

*Primary Examiner* — Mark R Wendell
(74) *Attorney, Agent, or Firm* — Sheridan Ross P.C.

(57) ABSTRACT

A threaded fastener pair, including: a first threaded fastener with a male threaded portion; and a second threaded fastener with a female threaded portion, the female portion being configured to receive the male threaded portion, wherein the first threaded fastener is formed with a shank having an outer diameter approximately equal to an outer diameter of the second threaded portion, the second threaded fastener has a length equal to or greater than that of the first threaded fastener and the length of the first threaded fastener is at least 45 mm.

13 Claims, 9 Drawing Sheets

(51) Int. Cl.
*F16B 7/18* (2006.01)
*F16B 37/14* (2006.01)
*E04C 3/16* (2006.01)
*F16B 37/00* (2006.01)

(52) U.S. Cl.
CPC ............ *E04C 3/16* (2013.01); *E04H 12/2269* (2013.01); *F16B 2037/007* (2013.01)

(58) Field of Classification Search
USPC ....................................................... 52/169.13
See application file for complete search history.

(56) References Cited

U.S. PATENT DOCUMENTS

| | | | | |
|---|---|---|---|---|
| 1,966,044 | A * | 7/1934 | Place ................... | F16B 39/284 411/929 |
| 2,136,523 | A * | 11/1938 | Rosenberg ........... | F16B 41/005 411/959 |
| 2,283,494 | A * | 5/1942 | Erdman .................. | B21H 3/06 470/4 |
| 2,511,051 | A | 6/1950 | Dzus | |
| 2,722,259 | A * | 11/1955 | Eckenbeck ........... | F16B 37/122 29/520 |
| 2,751,806 | A * | 6/1956 | Dickie .................. | B60K 15/0406 411/542 |
| 2,752,814 | A * | 7/1956 | Iaia ...................... | F16B 43/001 D8/387 |
| 2,892,650 | A * | 6/1959 | Runton .................. | F16J 15/108 277/650 |
| 2,982,166 | A * | 5/1961 | Hobbs ................. | F16B 25/0015 411/959 |
| 3,175,454 | A * | 3/1965 | Morse .................. | F16B 33/004 411/542 |
| 3,252,495 | A * | 5/1966 | Waltermire ............. | F16B 4/004 411/176 |
| 3,299,766 | A * | 1/1967 | Gould .................. | F16B 43/001 411/371.1 |
| 3,370,631 | A * | 2/1968 | James .................. | F16B 35/065 411/959 |
| 3,414,304 | A * | 12/1968 | Miller .................. | F16B 37/145 411/339 |
| 3,459,447 | A * | 8/1969 | Wittmeyer ................ | F16B 5/01 52/794.1 |
| 3,462,114 | A * | 8/1969 | O'Dell, Jr. ............ | F16B 43/005 411/338 |
| 4,033,243 | A | 7/1977 | Kirrish et al. | |
| 4,199,908 | A | 4/1980 | Teeters | |
| 4,310,273 | A * | 1/1982 | Kirrish .................. | F16B 39/282 411/338 |
| 4,490,083 | A * | 12/1984 | Rebish .................. | F16B 37/122 411/338 |
| 4,609,317 | A * | 9/1986 | Dixon ................... | B65D 19/38 29/523 |
| 4,924,648 | A | 5/1990 | Gilb et al. | |
| 5,165,882 | A * | 11/1992 | Shimizu ................ | F04B 49/065 418/270 |
| 5,290,131 | A * | 3/1994 | Henriksen ............ | F16B 37/145 411/338 |
| 5,375,384 | A | 12/1994 | Wolfson | |
| 5,421,356 | A * | 6/1995 | Lynch .................. | E04H 15/50 411/338 |
| 5,454,676 | A * | 10/1995 | Conte ................... | A63C 17/0006 411/339 |
| 5,477,929 | A * | 12/1995 | Kenyon ................. | A01B 1/22 172/372 |
| 5,597,161 | A * | 1/1997 | Bellehumeur ......... | A63B 67/14 473/588 |
| 5,707,373 | A * | 1/1998 | Sevrain ................ | A61B 17/688 411/338 |
| 6,012,763 | A * | 1/2000 | Clemente ................ | B60J 5/108 411/338 |
| 6,039,243 | A * | 3/2000 | Lickton .................. | A63B 55/60 280/47.131 |
| 6,041,823 | A * | 3/2000 | Kusama ................ | F16B 7/0486 411/338 |
| 6,258,091 | B1 * | 7/2001 | Sevrain ................ | A61B 17/688 606/301 |
| 6,270,500 | B1 * | 8/2001 | Lerch .................... | A61B 17/688 606/213 |
| 6,379,363 | B1 * | 4/2002 | Herrington ........ | A61B 17/8863 606/104 |
| 6,460,308 | B1 * | 10/2002 | Armstrong ............ | E04B 1/4157 52/514 |
| 6,513,290 | B2 | 2/2003 | Leek | |
| 6,514,005 | B2 * | 2/2003 | Shiokawa ............. | F16B 37/122 411/339 |
| 6,648,518 | B2 * | 11/2003 | Uchman ............... | F16C 19/186 384/589 |
| 6,685,707 | B2 * | 2/2004 | Roman ................ | A61B 17/688 606/305 |
| 6,854,921 | B2 * | 2/2005 | Melberg ................ | F16B 41/005 109/51 |
| 7,329,077 | B2 * | 2/2008 | Curtis .................... | F16B 35/06 411/188 |
| D592,097 | S * | 5/2009 | Androuais .................. | D11/222 |
| 7,563,063 | B1 * | 7/2009 | Madej .................... | F16B 19/08 411/339 |
| 7,850,148 | B2 | 12/2010 | Collins, IV | |
| 7,988,397 | B2 * | 8/2011 | Bodin ................... | F16B 35/048 411/399 |
| 8,210,785 | B1 * | 7/2012 | Gager ................... | E03D 11/16 411/338 |
| 8,544,196 | B2 * | 10/2013 | Leo ........................ | A43B 23/24 63/23 |
| 8,622,364 | B2 | 1/2014 | Bergman | |
| 8,959,857 | B1 | 2/2015 | Lin | |
| 9,033,631 | B2 * | 5/2015 | Greenberg ............. | F16B 39/01 411/258 |
| 9,200,590 | B2 * | 12/2015 | Griffiths ................ | F16B 37/145 |
| 9,333,825 | B2 * | 5/2016 | Stockard ................ | B23P 11/00 |
| 9,347,196 | B2 | 5/2016 | Wagler | |
| 9,353,778 | B2 * | 5/2016 | Chalverat ................ | F16B 5/02 |
| 9,366,278 | B2 * | 6/2016 | Ishida ................... | F16B 33/004 |
| 9,371,738 | B2 * | 6/2016 | Harris ..................... | F01D 11/22 |
| 9,377,046 | B1 * | 6/2016 | Lackey ................ | F16B 37/122 |
| 9,610,490 | B2 * | 4/2017 | Tambornino ........ | A63B 21/0728 |
| 9,758,350 | B2 * | 9/2017 | Frisch ................. | B66B 11/0226 |
| 9,759,510 | B1 * | 9/2017 | Kempf .................. | F16B 37/145 |
| 9,851,048 | B2 * | 12/2017 | Higgins ................. | F16M 13/02 |
| 9,861,163 | B2 * | 1/2018 | Leo ......................... | A43B 23/24 |
| 9,909,634 | B2 * | 3/2018 | Brandl .................. | F16D 55/224 |
| 9,938,745 | B1 | 4/2018 | Fox | |
| 9,943,137 | B2 * | 4/2018 | Leo ......................... | A43B 23/24 |
| 9,976,591 | B2 * | 5/2018 | Lambert ................ | F16B 43/001 |
| 10,071,766 | B2 * | 9/2018 | Chapple ................ | B62D 21/02 |
| 10,130,110 | B2 * | 11/2018 | Klimke ................ | B01F 35/75425 |
| 10,143,269 | B2 * | 12/2018 | Leo ......................... | A43B 23/24 |
| 10,166,015 | B2 * | 1/2019 | Klein .................. | A61B 17/0057 |
| 10,330,347 | B2 | 6/2019 | Yang | |
| 10,392,228 | B2 * | 8/2019 | Miller ...................... | A47H 1/18 |
| 10,392,234 | B2 * | 8/2019 | Bryan .................... | B66C 23/62 |
| 10,677,566 | B2 * | 6/2020 | Dantzer ................. | E04C 2/24 |
| D897,830 | S * | 10/2020 | Roberto ........................ | D8/397 |
| D898,559 | S * | 10/2020 | Hill ........................ | F16B 37/14 D8/397 |
| D905,547 | S * | 12/2020 | Campion ...................... | D8/397 |
| 10,907,680 | B2 * | 2/2021 | Hill ....................... | F16B 5/0642 |
| 10,920,813 | B2 * | 2/2021 | Perroud ................. | F16B 33/004 |
| 10,954,989 | B2 * | 3/2021 | Lucas ................... | F16B 25/0078 |
| 11,028,969 | B2 * | 6/2021 | Weathers ................ | F17C 13/086 |

(56) References Cited

U.S. PATENT DOCUMENTS

| | | | | |
|---|---|---|---|---|
| 11,649,951 B1 * | 5/2023 | Kennemer | ............ | H05B 47/20 29/593 |
| 2016/0069375 A1 | 3/2016 | Henricksen, Jr. | | |

FOREIGN PATENT DOCUMENTS

| | | |
|---|---|---|
| WO | WO 2006/122894 | 11/2006 |
| WO | WO 2018/092938 | 5/2018 |
| WO | WO 2021/003524 | 1/2021 |

OTHER PUBLICATIONS

International Search Report and Written Opinion for International (PCT) Patent Application No. PCT/AU2020/050698, dated Oct. 9, 2020, 10 pages.
Official Action for U.S. Appl. No. 17/624,988, dated Dec. 4, 2023 6 pages.
Extended Search Report for European Patent Application No. 20835989.3, dated May 25, 2023, 5 pages.

\* cited by examiner

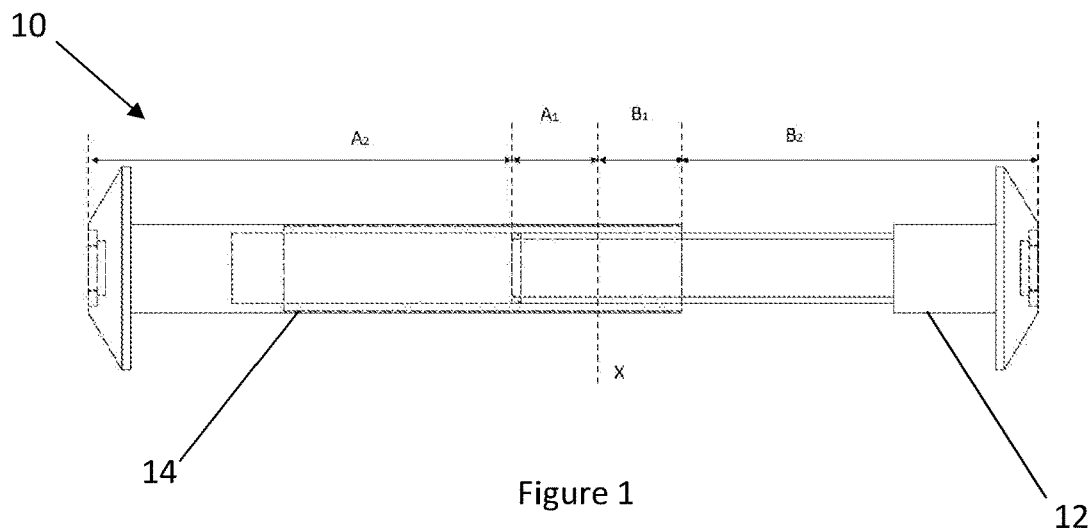
Figure 1
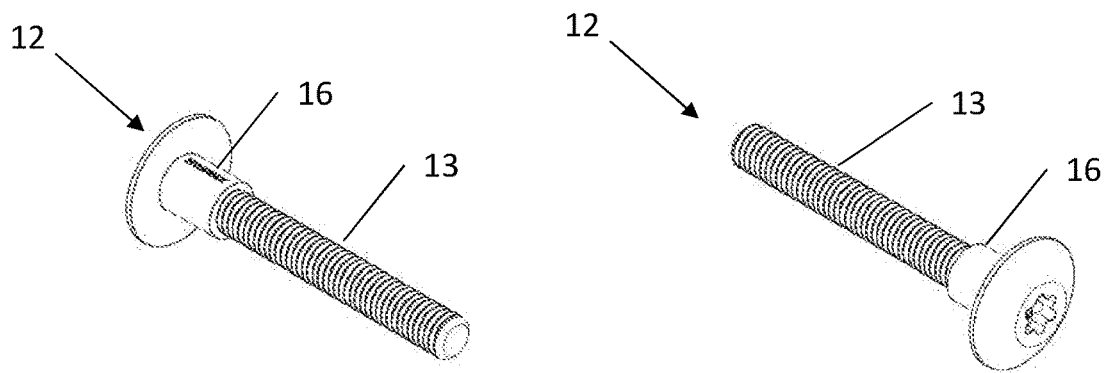
Figure 2a
Figure 2b
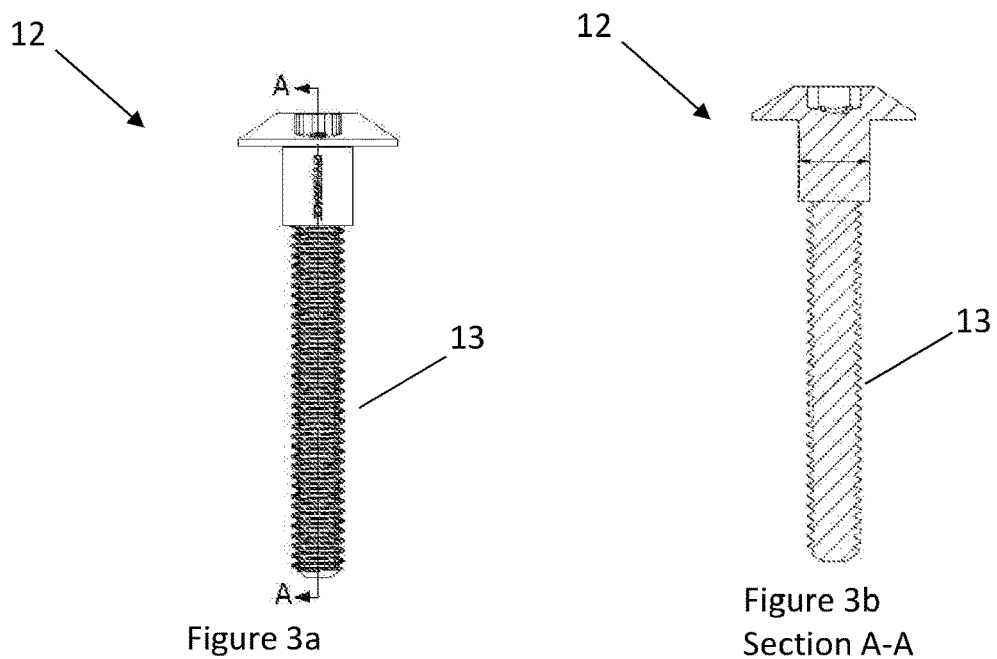
Figure 3a
Figure 3b
Section A-A

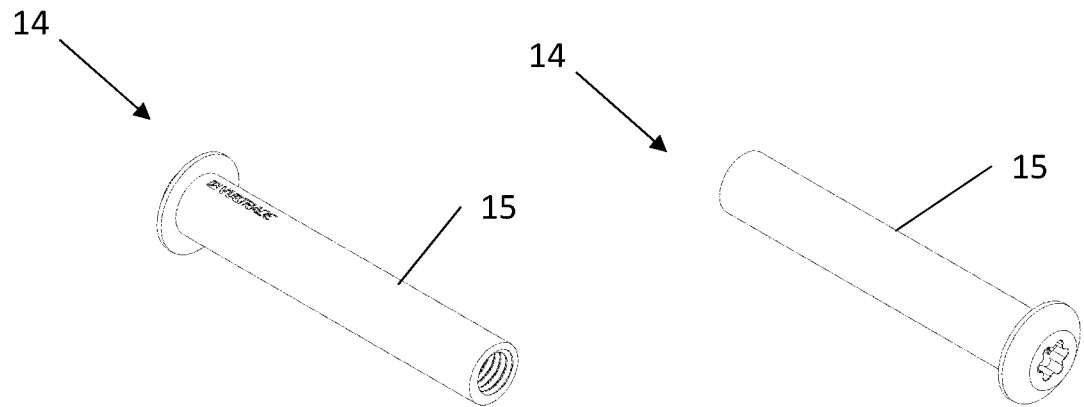
Figure 4a
Figure 4b
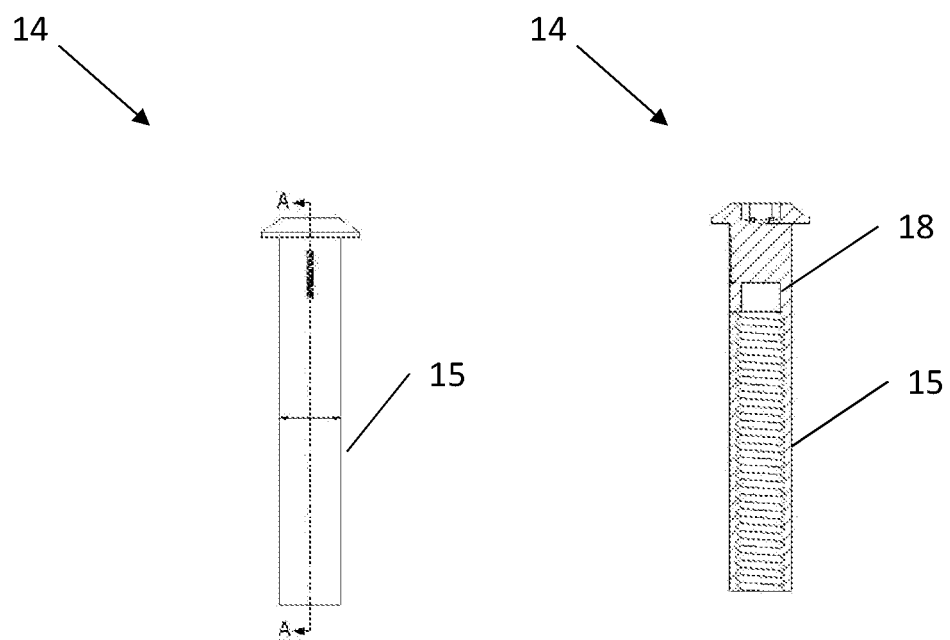
Figure 5a
Figure 5b
Section A-A

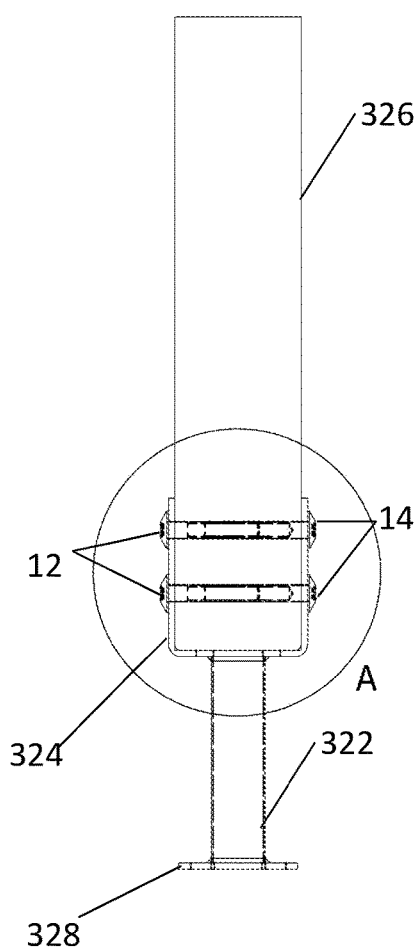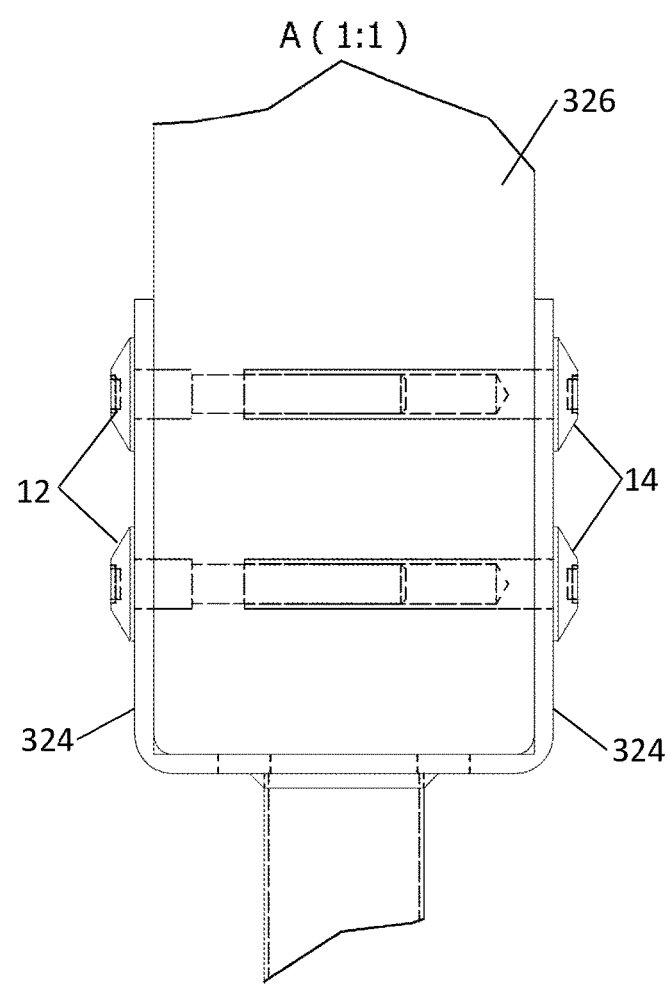
Figure 11a
Figure 11b

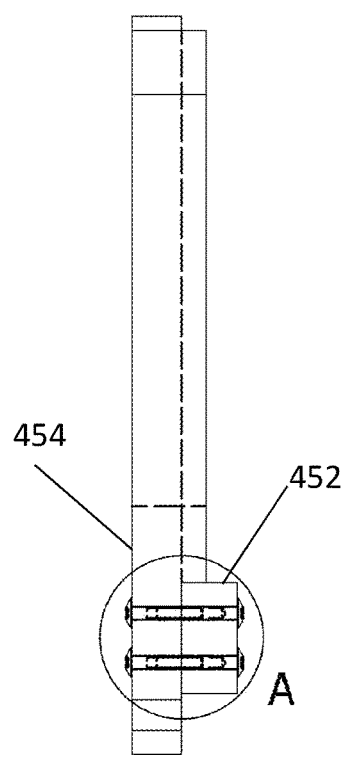 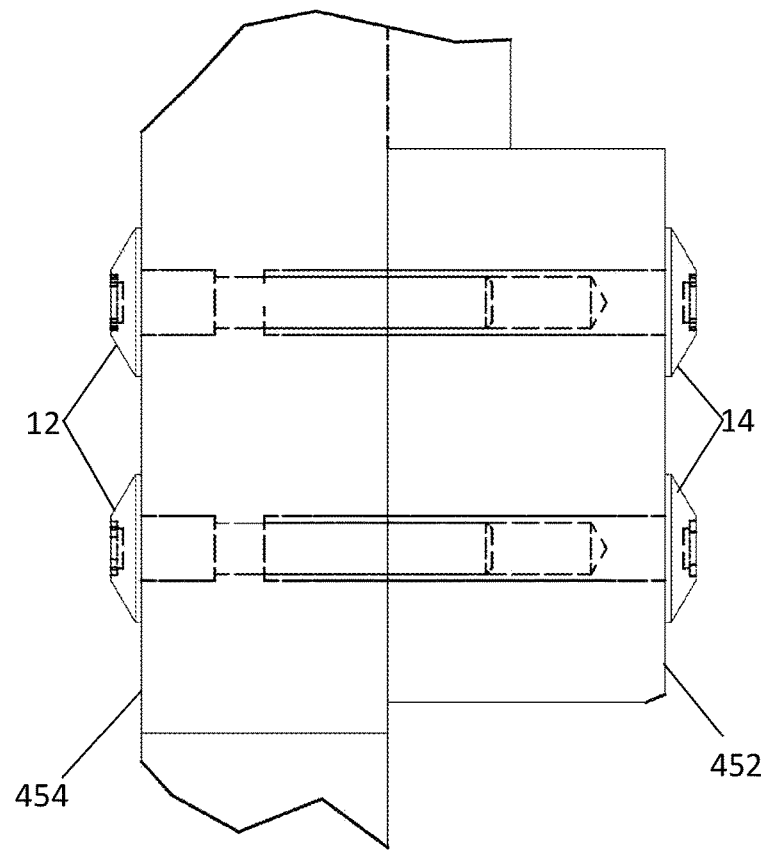
Figure 13a
Figure 13b

THREADED FASTENER PAIR, POST ANCHOR SYSTEM AND METHOD OF SECURING A POST TO A POST ANCHOR

CROSS REFERENCE TO RELATED APPLICATIONS

This application is a national stage application under 35 U.S.C. § 371 and claims the benefit of PCT Application No. PCT/AU2020/050470 having an international filing date of 13 May 2020, which designated the United States, which PCT application claimed the benefit of Australia Patent Application No. 2019901647 filed 14 May 2019, the disclosures of each of which are incorporated herein by reference in their entireties.

FIELD OF THE INVENTION

The present invention relates to a threaded fastener pair for joining materials together, in particular for applications where both ends of the fastener are visible, and for use with a post anchor system. The present invention also relates to a post anchor system and a method of securing a post to a post anchor.

BACKGROUND

Conventional bolts are often used for joining material such as timber pieces together as they are easy to use, reliable and cost effective. However, in applications where both sides or ends of the fastener are visible, an exposed end of thread protruding from a nut at one end of the fastener is visually unappealing and can potentially cause injury through unintentional contact. To minimise the length of thread protruding from a nut, variously sized fasteners are required to be provided.

There are many applications for such connections, including for example, timber to timber connections, particularly for roof truss connections, joist connections, staircases, handrails, exposed beams, architectural timber connections, exposed rafter connections, and LVL beam connector bolts.

A further application of such a connection is with a post support or anchor for a vertical post. Post supports are a convenient way of supporting and securing a vertical post to a ground surface such as concrete. However, some previous post anchors have been visually unappealing and also typically require traditional bolts extending transversely through an end of the post for securing the post to the anchor and this results, on one side of the anchor, in a nut and exposed thread being visible and exposed for unintentional contact. Such an arrangement is visually undesirable and unintentional contact with an exposed end of a threaded bolt has the potential to cause injury.

Furthermore, it is desirable to ensure that the connection between the post and the anchor is secure as possible.

There is a need to address the above, and/or at least provide a useful alternative.

SUMMARY

According to a first aspect of the invention there is provided a threaded fastener pair, including:
a first threaded fastener with a male threaded portion; and
a second threaded fastener with a female threaded portion, the female portion being configured to receive the male threaded portion,
wherein the first threaded fastener is formed with a shank having an outer diameter approximately equal to an outer diameter of the second threaded fastener, the second threaded fastener has a length equal to or greater than that of the first threaded fastener and the length of the first threaded fastener is at least 45 mm.

Preferably, at a base of the female threaded portion is an unthreaded bore.

According to another aspect of the invention there is provided a threaded fastener pair, including:
a first threaded fastener with a male threaded portion; and
a second threaded fastener with a female threaded portion, the female portion being configured to receive the male threaded portion,
wherein the first threaded fastener is formed with a shank having an outer diameter approximately equal to an outer diameter of the second threaded portion, the second threaded fastener has a length equal to or greater than that of the first threaded fastener and at a base of the female threaded portion is an unthreaded bore.

Preferably, the length of the first threaded fastener is at least 45 mm.

According to preferred embodiments, a shank of the first threaded fastener is at least 5 mm long and has a diameter of at least 10 mm. Preferably, each fastener is formed with a domed head having a socket drive.

According to another aspect of the invention there is provided a post anchor system, comprising:
a post support securable to a ground surface and having at least one blade portion extending upwardly therefrom for engagement with a generally vertical post, the blade portion having at least one aperture through which a fastener can extend to secure the post to the support; and
at least one threaded fastener pair including:
a first threaded fastener with a male threaded portion; and
a second threaded fastener with a female threaded portion, the female portion being configured to receive the male threaded portion,
wherein the first threaded fastener is formed with a shank having an outer diameter approximately equal to an outer diameter of the second threaded fastener.

According to preferred embodiments, the second threaded fastener has a length equal to or greater than that of the first threaded fastener. Preferably, the length of the first threaded fastener is at least 45 mm.

Preferably, the blade portion is centrally disposed on the support which is configured to be received in a slit formed in an end of the post. Preferably, the slit extends along a central longitudinal axis of the post.

The system may have two, three or four threaded fastener pairs. The post support may have a concealing cap to cover a bolt down portion at a lower portion of the post support.

According to another aspect of the invention there is provided a threaded fastener pair for use with a post support system of the above described type.

According to another aspect of the invention there is provided a method of securing a post to a post support, including the steps of:
providing a post;
providing a post support securable to a ground surface and having at least one blade portion extending upwardly therefrom for engagement with the post, the blade portion having at least one aperture through which a fastener can extend to secure the post to the support;

providing at least one threaded fastener pair including:
  a first threaded fastener with a male threaded portion; and
  a second threaded fastener with a female threaded portion, the female portion being configured to receive the male threaded portion,
  wherein the first threaded fastener is formed with a shank having an outer diameter approximately equal to an outer diameter of the second threaded fastener,
forming at least one hole transversely through an end of the post through which the fastener pair can be received;
bringing the post into engagement with the post support; and
passing each fastener of the fastener pair through an opposite side of the post and through the blade portion and bringing them into engagement to secure the post to the support.

Preferably, the method further includes the step of cutting a slot in an end of the post for receipt of the blade portion, the slot passing through a central longitudinal axis of the post.

BRIEF DESCRIPTION OF THE DRAWINGS

In order that the invention may be more easily understood, an embodiment will now be described, by way of example only, with reference to the accompanying drawings, in which:

FIG. 1 is a side view of a fastener pair according to one embodiment of the invention;

FIGS. 2a and 2b are perspective views of male fastener of the pair;

FIGS. 3a and 3b are respective side and sectional side views of the fastener of FIGS. 2a and 2b;

FIGS. 4a and 4b are perspective views of a female fastener of the pair; and

FIGS. 5a and 5b are respective side and sectional side views of the fastener of FIGS. 4a and 4b.

FIG. 7b is an enlarged sectional view of Detail A of FIG. 7a;

FIG. 9a is another post anchor for use with the system;

FIG. 9b is a cap for use with the post anchor of FIG. 9a;

FIG. 11a is a side view of the system of FIG. 10;

FIG. 11b is an enlarged sectional view of Detail A of FIG. 11a;

FIG. 13a is a side view of the connection of FIG. 12 and

FIG. 13b is an enlarged sectional view of Detail A of FIG. 13a.

DETAILED DESCRIPTION

Figure 6:
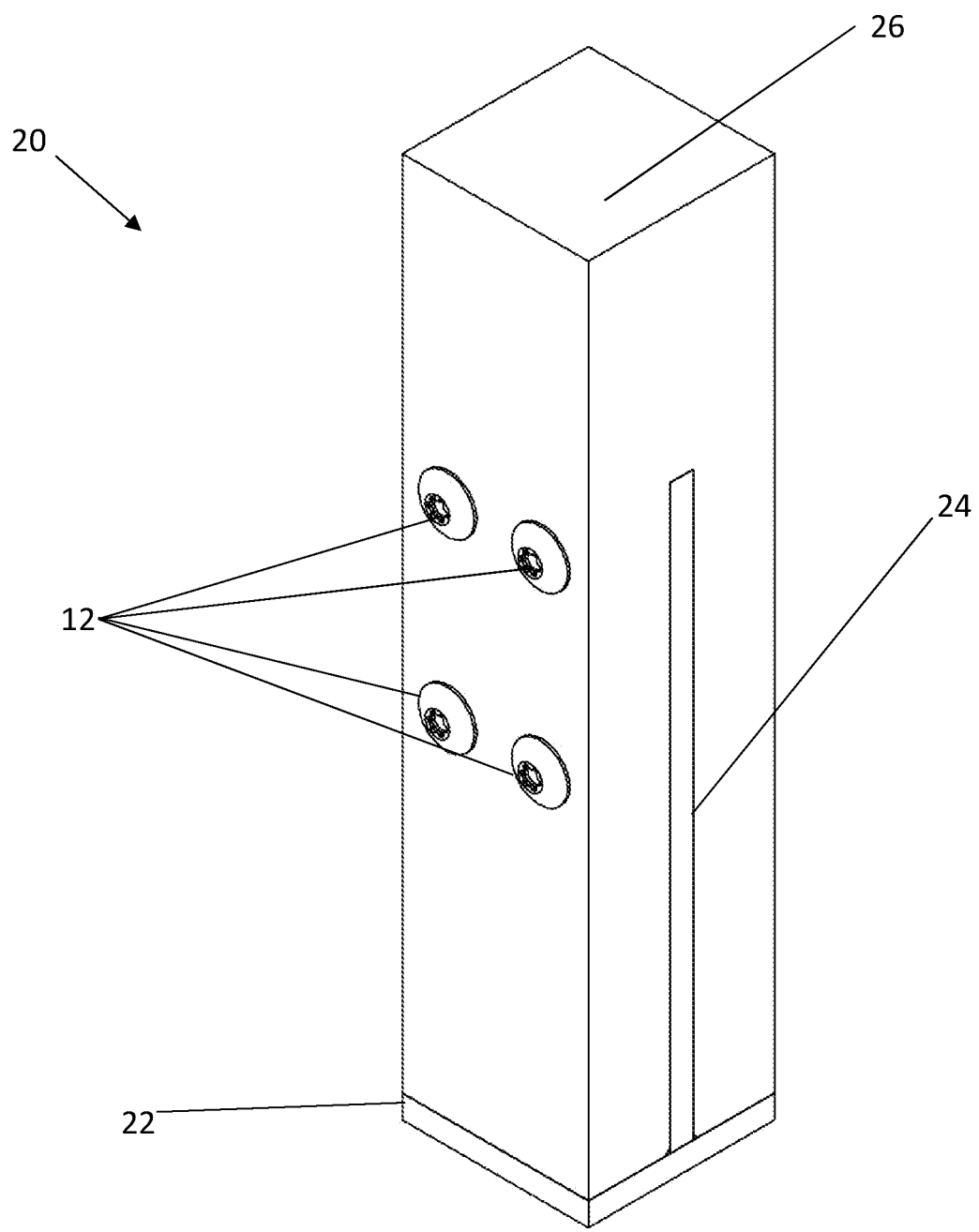
FIG. 6 is a perspective view of a post anchor system according to a preferred embodiment of the invention.

A threaded fastener pair 10 according to a preferred embodiment of the invention is illustrated in FIG. 1.

The threaded fastener pair 10 includes a first fastener 12 with a male threaded portion 13, and a second fastener 14 with a female threaded portion 15. The female threaded portion 15 is configured to receive the male threaded portion 13.

In the illustrated embodiment, the fasteners are of equal length and length A2 equals length B2. Also, length A1 equals length B1, with B1 being the length of which fastener 14 extends past the midpoint or centreline x between the heads of each fastener.

The first fastener 12 is formed with a shank 16 having an outer diameter approximately equal to an outer diameter of the second fastener 14. In a preferred form, the shank 16 of the first threaded fastener 12 is at least 5 mm long and has a diameter of at least 10 mm.

In preferred embodiments, the second threaded fastener 14 has a length equal to or greater than that of the first threaded fastener 12 and the length of the first threaded fastener 12 is at least 45 mm. In preferred forms, the first threaded fastener 12 is available in lengths of 45 mm, 50 mm, 70 mm, 110 mm and 190 mm, though it will be appreciated that longer lengths may also be possible.

By providing a first threaded fastener 12 with a shank 16 having an outer diameter that is approximately equal to an outer diameter of the second fastener 14, and the fasteners 12, 14 being of equal length, when joining two materials together an inner bore of the materials is well supported, as will be further described below. Such a connection is particularly useful for a post anchor connection where strong engagement between the post, the anchor and the fastener is required.

Those skilled in the art will appreciate that the female threaded portion 15 is quite long compared to prior art fasteners of this type. To allow such a deep thread to be formed, at a base of the female threaded portion is an unthreaded bore 18.

Each fastener 12, 14 is formed with a domed head having a socket drive. The domes head may be a truss head or button head for example. Also, any suitable socket type may be used, such as a star drive or hex socket for example.

Figure 7A:
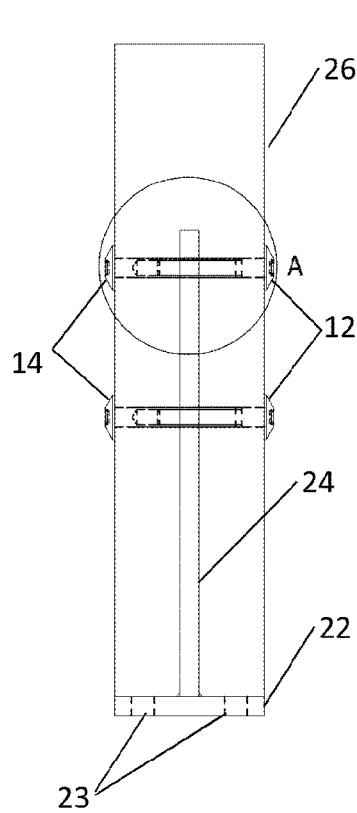
FIG. 7a is a side view of the system of FIG. 6.
Figure 7B:
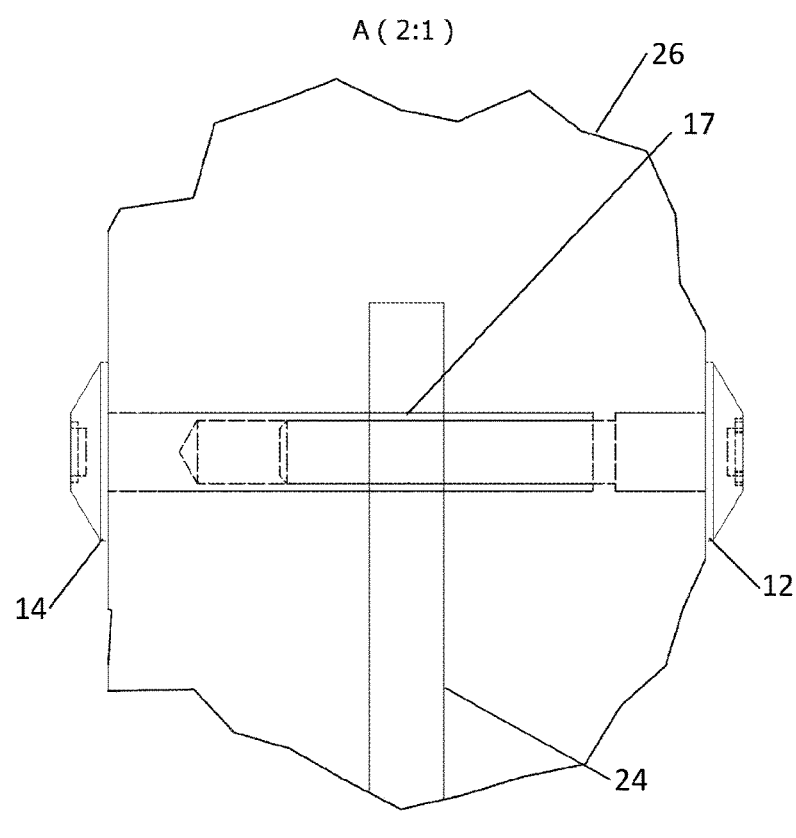

FIGS. 6, 7a and 7b illustrate the threaded fastener pair 10 in use with a post support system 20 of a first embodiment, which includes a post support 22 having an upwardly extending blade 24, and a generally vertical post 26. In this example, four threaded fastener pairs are used and extend through apertures 17 formed in the blade 24.

The post support 22 is provided with apertures 23 to allow securement of the post 22 to a ground surface.

Each threaded fastener pair is configured for extending through a transverse hole formed in an end of the post 26 and through an aperture formed in the support 22. In use, a hole is formed in the post 26, the hole being of the same size as the corresponding aperture in the support 22.

In use, the size of the first and second fasteners is chosen to provide a sufficient overlap, which is preferably 30 mm, at the centre of the connection, i.e. the midpoint between the heads of the first and second fasteners 12, 14, so that not only the blade 24 is supported on the fastener pair 10, but the post immediately beside the blade 24 is well supported on both sides of the blade 24 and also by the shank 16 near the head of the first fastener 12. This provides a secure connection between the post 26 and the post support 22, with equivalent strength to a conventional bolted connection, but without suffering the above mentioned drawbacks of using conventional threaded fasteners.

Using a threaded fastener pair of a male/female threaded fasteners 12, 14 allows any excess thread to be accommodated within the connection of the fasteners so that the only parts visible from outside of the system are two bolt heads, which are preferably domed heads. This provides a nice clean finish, and removes any exposed thread/nuts that can look untidy and may unintentionally cause injury. Such an arrangement also means that a limited number of sizes can be provided for multiple applications.

Although illustrated as having dome heads with a socket for receipt of a star driver bit, which is the preferred embodiment, it will be appreciated that the fastener heads may take other forms such as a standard hexagon head, rounded screw head, button or countersunk hexagon socket for example.

With threaded fastener pair 10, structural integrity of the fastener joint is improved as the centre of the bolt is always between the heads of the fasteners to provide loading through a central plane of the post 12, and avoiding offset loading creating torque on the joint.

Also, as excess thread can easily be accommodated within the connection, only a limited number of sized bolts are required to be provided and can be used for many different sized posts, thereby reducing the costs associated with making and stocking many different sized fastener pairs. It is envisaged that five sizes of male/female threaded portion will be sufficient, one with a length of 45 mm, one with a length of 50 mm, one with a length of 70 mm, one with a length of 110 mm and one with a length of 190 mm.

In the illustrated embodiments, four threaded fastener pairs are provided, though it will be appreciated that to suit the different requirements of a specific application, embodiments having less than or more than four fastener pairs may also be provided.

Figure 8:
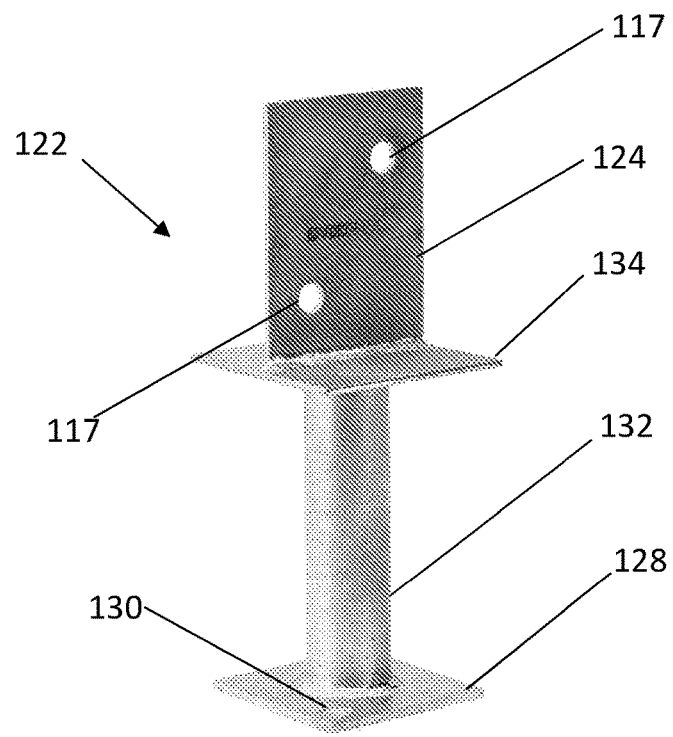
FIG. 8 is an alternative post anchor for use with the system.

Another example of post support 122 for use with the threaded fastener pair and post support system is illustrated in FIG. 8. In addition to having a central upstanding blade 124 for engagement with a post (not shown), two apertures 117 are formed in the blade 124 through which a threaded fastener pair can extend to secure the post to the support 122. Again, it will be appreciated that the number of threaded fastener pairs used can be varied.

The post support 122 includes a base 128 to be received against a surface to which the post is to be secured, which is typically a concrete surface, and an aperture 130 through which a fastener can extend to secure the post support 122 to the surface. A stand 132 is provided to space the end of the post from the ground surface and may be any desired length. A plate 134 is secured to the stand 132 and provided for abutment with an end of the post.

Figures 9A, 9B:
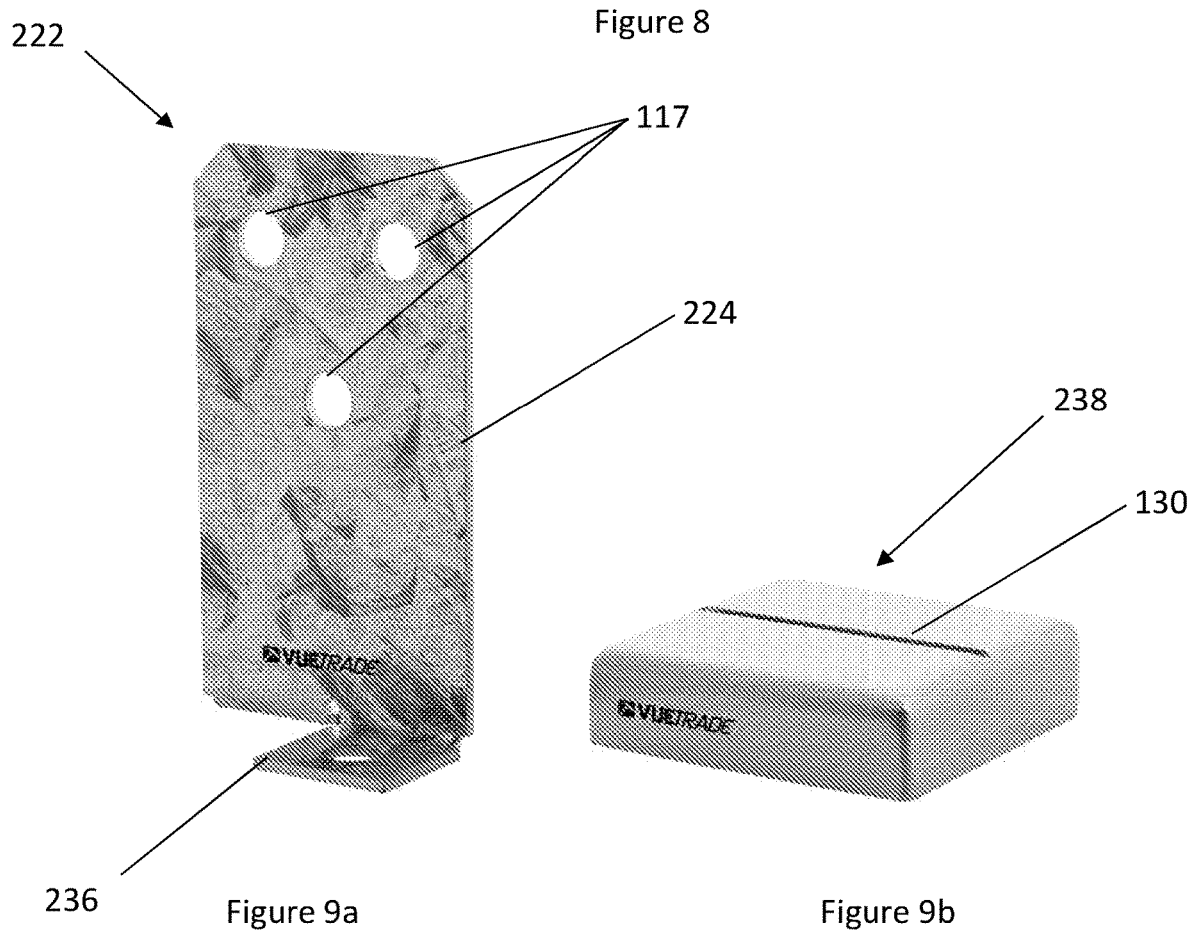

FIG. 9a illustrates another post support 222 for use with the threaded fastener pair and a further embodiment of the post support system. In this embodiment, stand 132 and plate 134 are omitted, with blade portion 224 being provided with a mounting flange 236 for securement to the surface. Post support 222 may be formed of a single piece of material, or from two or more pieces of material. As can be seen in FIG. 9b, a concealing cap 238 is provided to cover the flange 236 and end of the blade portion 224 to provide a clean finish. In use, after flange 236 is secured to a surface, cap 238 is passed over the bladed portion 224 before the post is secured to the post support 222.

In each of the post supports 22, 122, 222 the blade portion 24, 124, 224 is centrally disposed on the support 22, 122, 222 so as to be generally in alignment with a longitudinal axis of the post. In other embodiments, it may be offset toward a side of the post, or configured so as to abut an external side surface of the post. Also, more than one blade portion 24, 124, 224 may be provided, as will be described further below.

In use, to form a connection between the post and the post support 22, 122, 222, a slit is first cut in an end of a post to be secured. The slit is formed to correspond to a blade portion 24, 124, 224 of the post support. Transverse holes are formed in the same end of the post 12 and positioned to align with apertures 17, 117 formed in the support 22, 122, 222, which is secured to a ground surface, which may be a concrete surface for example, using commonly available concrete fasteners.

Figure 10:
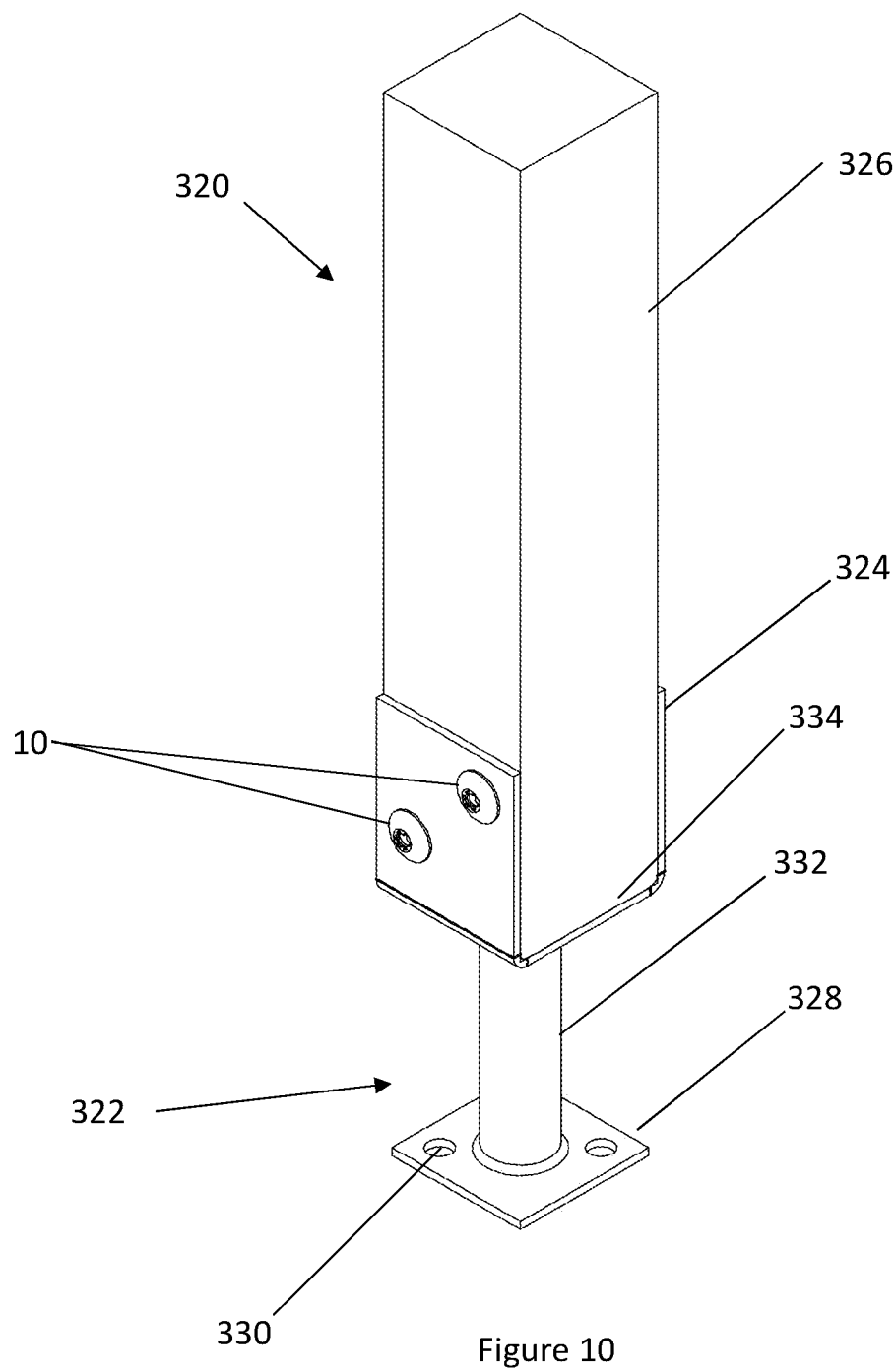
FIG. 10 is a perspective view of a post anchor system according to another embodiment.

FIGS. 10, 11a and 11b illustrate a further post support system 320. This system 329 uses a post support 322 having a "U" or saddle shape, having two upstanding blade portions 124, which are configured to be received on opposite external sides of the post 326.

Two threaded fastener pairs 10 are used and again it will be appreciated that the number of apertures provided can be varied.

As per post support 122, post support 322 has a base 328 to be received against a surface to which the post is to be secured, which is typically a concrete surface, and two apertures 330 through which a fastener can extend to secure the post support 322 to the surface. A stand 332 is provided to space the end of the post from the ground surface and may be any desired length. A support portion 334 is secured to the stand 332 and provided for abutment with an end of the post. In the illustrated embodiment, the support portion 334 and the two blade portions 324 are integrally formed.

As can be seen in FIGS. 11a and 11b, the post support 322 is supported on both sides by close engagement with the male/female threaded fasteners 12, 14. In this regard, on one side the post support 322 sits on the female fastener 14 and on the other side the post support 322 sits on the shank of the male fastener 12. Using a threaded fastener pair of a male/female threaded fasteners 12, 14 allows any excess thread to be accommodated within the connection of the fasteners so that the only parts visible from outside of the system are two bolt heads, which are preferably domed heads. This provides a nice clean finish, and removes any exposed thread/nuts that can look untidy and may unintentionally cause injury.

Also, as can be seen in FIG. 11b, each fastener is solid where it passes through the blade portion 324 and into the post. As such the post sits on a solid section within the fasteners so as to mimic the load support of a conventional bolt. If the female fastener was hollow in this area, it could be vulnerable to shear under high loading.

It will be appreciated that the described post anchors can come in many different sizes and configurations for use in different applications and with differently sized posts. For example, different post anchors may have differently sized plates and stands, number and sizes of apertures and lengths of blade.

Figure 12:
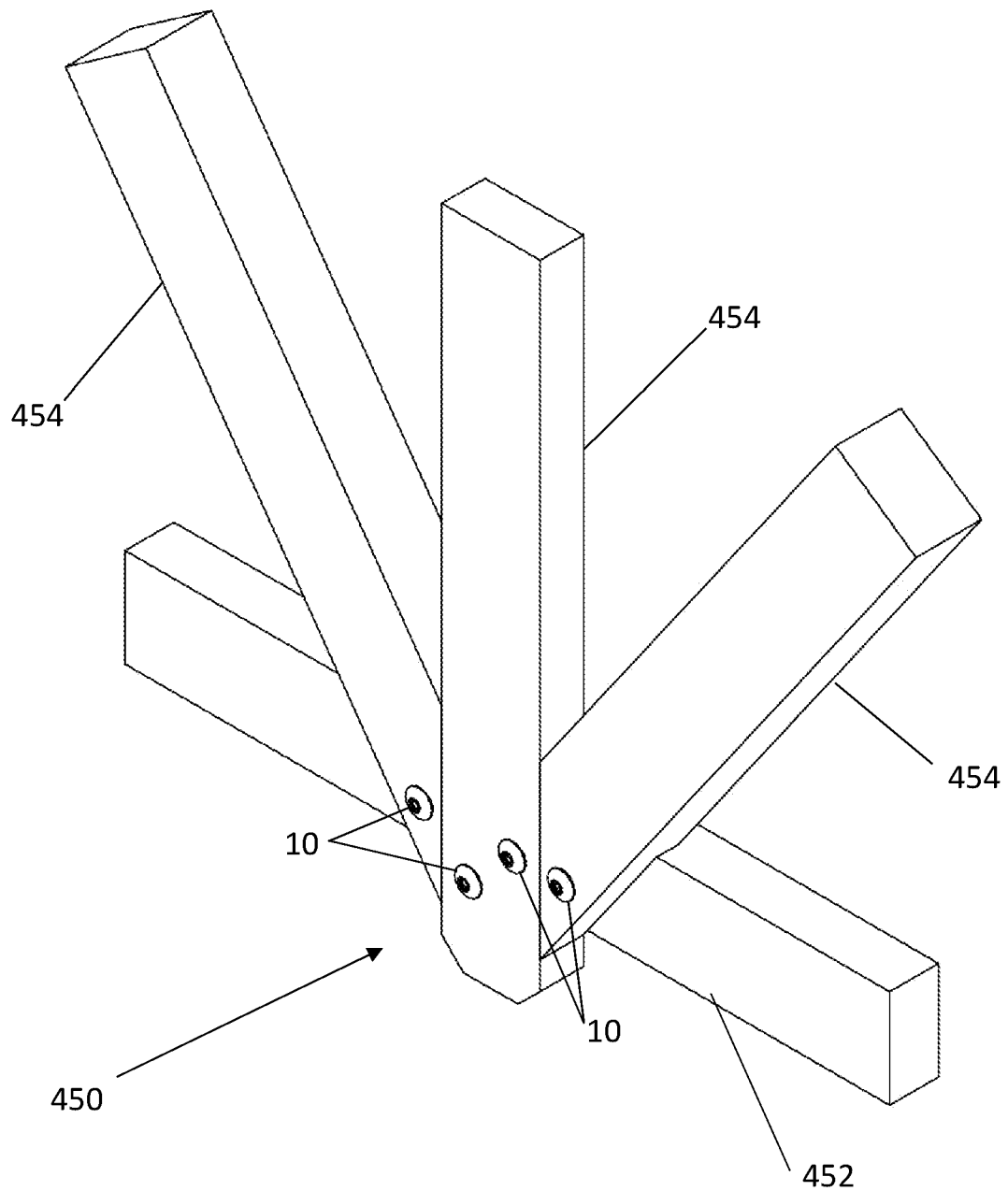
FIG. 12 is a perspective view of a fastener pair of FIG. 1 used in a timber to timber connection.

FIGS. 12, 13a and 13b illustrate the use of the fastener pair 10 in a timber to timber connection 450.

The connection 450 is part of a roof truss and formed between bottom chord 452 and truss webs 454. In this example, two threaded fastener pairs are used to secure the vertical web to the bottom chord 452 and a single threaded fastener pair for securing the other webs.

As can be seen in FIGS. 13a and 13b, the length of the first and second fasteners is chosen to provide a sufficient overlap, which is preferably 30 mm, at the centre of the connection, i.e. the midpoint between the heads of the first and second fasteners 12, 14, so that both the bottom chord 452 and the web 454 are located/aligned with each other and well supported on the bore of the apertures formed therein. In this regard, the female threaded fastener 14 extends through the bottom chord 452 and partially into the web 454, which is supported on one side by the female threaded fastener and at the other side, the shank 16 of the first threaded fastener 12.

This provides a secure connection between the post 26 and the post support 22, without suffering the above mentioned drawbacks of using conventional threaded fasteners.

Again, it will be seen that using a threaded fastener pair of a male/female threaded fasteners 12, 14 allows any excess thread to be accommodated within the connection of the fasteners so that the only parts visible from outside of the system are two bolt heads, which are preferably domed heads. This provides a nice clean finish, and removes any exposed thread/nuts that can look untidy and may unintentionally cause injury.

During assembly, for each aperture formed in the material to be connected, which may be a post with a post anchor or a bottom chord and webs of a truss, a threaded fastener pair is provided. Once the materials are brought into engagement with each other, the fasteners of the pair are inserted into the apertures from opposite sides of the joint. Once the fasteners are in engagement with each other, they can be tightened so that a head of each fastener clamps against an external surface of the materials to secure them together. The result is a secure, well supported and visually clean joint, without an exposed end of a threaded fastener being visible.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

What is claimed is:

1. A threaded fastener pair, including:
   a first threaded fastener with a male threaded portion; and
   a second threaded fastener with a female threaded portion, the female threaded portion being configured to receive the male threaded portion,
   wherein the first threaded fastener is formed with a shank having an outer diameter approximately equal to an outer diameter of the female threaded portion of the second threaded fastener, and wherein the second threaded fastener has a length equal to or greater than that of the first threaded fastener and the length of the first threaded fastener is at least 45 mm.

2. A threaded fastener pair according to claim 1, wherein at a base of the female threaded portion is an unthreaded bore.

3. A threaded fastener pair according to claim 1, wherein a shank of the first threaded fastener is at least 5 mm long and has a diameter of at least 10 mm.

4. A threaded fastener pair according to claim 1, wherein each fastener is formed with a domed head having a socket drive.

5. A post anchor system, comprising:
   a post support securable to a ground surface and having at least one blade portion extending upwardly therefrom for engagement with a generally vertical post, the at least one blade portion having at least one aperture through which a fastener can extend to secure the generally vertical post to the post support; and
   at least one threaded fastener pair including:
      a first threaded fastener with a male threaded portion; and
      a second threaded fastener with a female threaded portion, the female threaded portion being configured to receive the male threaded portion,
      wherein the first threaded fastener is formed with a shank having an outer diameter approximately equal to an outer diameter of the female threaded portion, and
      wherein the second threaded fastener has a length equal to or greater than that of the first threaded fastener.

6. A system according to claim 5, wherein the length of the first threaded fastener is at least 45 mm.

7. A system according to claim 5, wherein the at least one blade portion is centrally disposed on the post support which is configured to be received in a slit formed in an end of the generally vertical post.

8. A system according to claim 7, wherein the slit extends along a central longitudinal axis of the generally vertical post.

9. A system according to claim 5, having three or four threaded fastener pairs.

10. A system according to claim 5, wherein the post support has a concealing cap to cover a bolt down portion at a lower portion of the post support.

11. A threaded fastener pair for use with a post support system according to claim 5.

12. A method of securing a post to a post support, including the steps of:
    providing a post;
    providing a post support securable to a ground surface and having at least one blade portion extending upwardly therefrom for engagement with the post, the blade portion having at least one aperture through which a fastener can extend to secure the post to the post support;
    providing at least one threaded fastener pair according to claim 1;
    forming at least one hole transversely through an end of the post through which the at least one threaded fastener pair can be received;
    bringing the post into engagement with the post support; and
    passing each fastener of the at least one threaded fastener pair through an opposite side of the post and through the blade portion and bringing them into engagement to secure the post to the post support.

13. A method according to claim 12, further including the step of cutting a slot in an end of the post for receipt of the blade portion, the slot passing through a central longitudinal axis of the post.

* * * * *